US012597595B2

(12) United States Patent
Kim et al.

(10) Patent No.: US 12,597,595 B2
(45) Date of Patent: Apr. 7, 2026

(54) POSITIVE ELECTRODE ACTIVE MATERIAL FOR RECHARGEABLE LITHIUM BATTERY AND RECHARGEABLE LITHIUM BATTERY INCLUDING SAME

(71) Applicant: Samsung SDI Co., Ltd., Yongin-si (KR)

(72) Inventors: Young-Ki Kim, Yongin-si (KR); Soonrewl Lee, Yongin-si (KR); Young-Hun Lee, Yongin-si (KR); Jiyeon Jang, Yongin-si (KR); Ickkyu Choi, Yongin-si (KR); Mingzi Hong, Yongin-si (KR); Soonkie Hong, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 454 days.

(21) Appl. No.: 16/960,791

(22) PCT Filed: Mar. 6, 2019

(86) PCT No.: PCT/KR2019/002593
§ 371 (c)(1),
(2) Date: Jul. 8, 2020

(87) PCT Pub. No.: WO2019/221374
PCT Pub. Date: Nov. 21, 2019

(65) Prior Publication Data

US 2021/0066712 A1 Mar. 4, 2021

(30) Foreign Application Priority Data

May 17, 2018 (KR) ........................ 10-2018-0056579

(51) Int. Cl.
*H01M 4/36* (2006.01)
*H01M 4/02* (2006.01)
(Continued)

(52) U.S. Cl.
CPC ......... *H01M 4/366* (2013.01); *H01M 4/0471* (2013.01); *H01M 4/131* (2013.01);
(Continued)

(58) Field of Classification Search
CPC .............................. H01M 4/366; H01M 4/525
See application file for complete search history.

(56) References Cited

U.S. PATENT DOCUMENTS

| | | | | |
|---|---|---|---|---|
| 8,557,440 B2 * | 10/2013 | Yu | H01M 4/525 429/231.95 | |
| 8,877,372 B2 * | 11/2014 | Kanemoto | H01M 4/366 429/206 | |

(Continued)

FOREIGN PATENT DOCUMENTS

| | | |
|---|---|---|
| CN | 102034976 A | 4/2011 |
| CN | 103620833 A | 3/2014 |

(Continued)

OTHER PUBLICATIONS

Kyono et al., High Pressure Behavior of Cuprospinel, 100 American Mineralogist, 1753 (2015). (Year: 2015).*

(Continued)

*Primary Examiner* — Nicole M. Buie-Hatcher
*Assistant Examiner* — Krishna R Hammond
(74) *Attorney, Agent, or Firm* — Womble Bond Dickinson (US) LLP

(57) ABSTRACT

The present invention relates to a positive electrode active material for a rechargeable lithium battery and a rechargeable lithium battery including same, wherein the positive electrode active material comprises a core and a surface layer formed on the surface of the core, the core comprising a first crystalline structure, the surface layer comprising a first crystalline structure and a second crystalline structure different from the first crystalline structure, the first crystal-
(Continued)

(a) (b)

line structure being present more than the second crystalline structure in the surface layer.

10 Claims, 7 Drawing Sheets

(51) Int. Cl.

| | |
|---|---|
| ***H01M 4/04*** | (2006.01) |
| ***H01M 4/131*** | (2010.01) |
| ***H01M 4/134*** | (2010.01) |
| ***H01M 4/1391*** | (2010.01) |
| ***H01M 4/1395*** | (2010.01) |
| ***H01M 4/505*** | (2010.01) |
| ***H01M 4/525*** | (2010.01) |
| ***H01M 10/0525*** | (2010.01) |

(52) U.S. Cl.

CPC ......... *H01M 4/134* (2013.01); *H01M 4/1391* (2013.01); *H01M 4/1395* (2013.01); *H01M 4/364* (2013.01); *H01M 4/505* (2013.01); *H01M 4/525* (2013.01); *H01M 10/0525* (2013.01); *H01M 2004/028* (2013.01)

(56) References Cited

U.S. PATENT DOCUMENTS

| | | | | |
|---|---|---|---|---|
| 9,557,440 | B2 * | 1/2017 | Dorovsky et al. | |
| 9,786,903 | B2 | 10/2017 | Ryu et al. | |
| 9,847,524 | B2 | 12/2017 | Yamamoto et al. | |
| 9,979,014 | B2 | 5/2018 | Kim et al. | |
| 10,276,862 | B2 | 4/2019 | Mun et al. | |
| 10,693,140 | B2 | 6/2020 | Piao et al. | |
| 10,763,503 | B2 | 9/2020 | Park et al. | |
| 10,829,385 | B2 | 11/2020 | Matsumoto et al. | |
| 11,011,746 | B2 | 5/2021 | Park et al. | |
| 11,258,054 | B2 | 2/2022 | Han et al. | |
| 2011/0076564 | A1 | 3/2011 | Yu et al. | |
| 2012/0045694 | A1 | 2/2012 | Park et al. | |
| 2013/0288131 | A1 * | 10/2013 | Chang | H01M 4/133 427/77 |
| 2014/0045067 | A1 * | 2/2014 | Cho | |
| 2014/0212759 | A1 | 7/2014 | Blangero et al. | |
| 2015/0099178 | A1 | 4/2015 | Kawakami et al. | |
| 2015/0171423 | A1 * | 6/2015 | Kim | H01M 4/1391 429/231.95 |
| 2016/0006031 | A1 | 1/2016 | Kaseda et al. | |
| 2016/0181610 | A1 | 6/2016 | Shim et al. | |
| 2017/0222211 | A1 * | 8/2017 | Ryu | H01M 4/502 |
| 2017/0250404 | A1 | 8/2017 | Cho | |
| 2017/0317342 | A1 | 11/2017 | Kang et al. | |
| 2018/0006302 | A1 | 1/2018 | Li et al. | |
| 2018/0102543 | A1 * | 4/2018 | Su | H01M 4/1393 |
| 2019/0006669 | A1 | 1/2019 | Park et al. | |
| 2019/0067689 | A1 | 2/2019 | Hong et al. | |
| 2020/0295367 | A1 | 9/2020 | Yoo et al. | |
| 2021/0013505 | A1 * | 1/2021 | Toyama | |
| 2022/0020982 | A1 | 1/2022 | Sun et al. | |

FOREIGN PATENT DOCUMENTS

| | | | | |
|---|---|---|---|---|
| CN | 105938917 | A | 9/2016 | |
| CN | 106797049 | A | 5/2017 | |
| CN | 110383541 | A | 10/2019 | |
| JP | 11-162466 | A | 6/1999 | |
| JP | 2008-198596 | A | 8/2008 | |
| JP | 2011-96626 | A | 5/2011 | |
| JP | 2013-243116 | A | 12/2013 | |
| JP | 2014-116296 | A | 6/2014 | |
| JP | 5791877 | B2 | 8/2015 | |
| JP | 2017-224590 | A | 12/2017 | |
| KR | 10-0441525 | B1 | 7/2004 | |
| KR | 10-2012-0017671 | A | 2/2012 | |
| KR | 10-2012-0121235 | A | 11/2012 | |
| KR | 10-2015-0040215 | A | 4/2015 | |
| KR | 10-2015-0070853 | A | 6/2015 | |
| KR | 10-2016-0039983 | A | 4/2016 | |
| KR | 10-2016-0040116 | A | 4/2016 | |
| KR | 10-2016-0040118 | A | 4/2016 | |
| KR | 10-2016-0074739 | A | 6/2016 | |
| KR | 10-1785265 | B1 | 10/2017 | |
| KR | 20170115939 | A * | 10/2017 | H01M 10/052 |
| KR | 20170116569 | A * | 10/2017 | C01G 53/04 |
| KR | 10-2017-0142393 | A | 12/2017 | |
| KR | 10-1897365 | B1 | 9/2018 | |
| KR | 10-2018-0121266 | A | 11/2018 | |
| KR | 10-2019-0059241 | A | 5/2019 | |
| KR | 10-2095008 | B1 | 3/2020 | |
| KR | 10-2020-0055674 | A | 5/2020 | |
| WO | 2012/171780 | A1 | 12/2012 | |
| WO | WO 2012-164752 | A1 | 12/2012 | |
| WO | WO-2016049014 | A1 * | 3/2016 | C01G 53/006 |

OTHER PUBLICATIONS

Zhang, et al., Atomic Insight into the Layered/Spinel Phase Transformation in Charged LiNi0.80Co0.15Al0.05O2 Cathode Particles, J. Phys. Chem. C 2017, 121, 3, 1421-1430). (Year: 2017).*

Korean Notice of Allowance dated Mar. 23, 2021, issued in corresponding Korean Patent Application No. 10-2018-0056579 (6 pages).

Kang, S.G., et al., "Electrochemical and structural properties of HT-LiCoO2 and LT-LiCoO2 prepared by the citrate sol-gel method," Solid State lonics, 1999, pp. 155-161.

Korean Office Action dated Sep. 1, 2020, issued in corresponding Korean Patent Application No. 10-2018-0056579 (6 pages).

Office action issued in Chinese Application No. 201980013786.1, dated Nov. 4, 2022, 13pp.

Decision of Rejection dated Apr. 17, 2023, of the corresponding Chinese Patent Application No. 201980013786.1, 10pp.

Cho,Yonghyun et al., (2011), "Spinel-Layered Core-Shell Cathode Materials for Li-Ion Batteries", Advanced Energy Materials, 1(5), p. 821-828, XP055849879 (8 pages).

Huang, Yan et al., (2019), "Preparation and Performance of the Heterostructured Material with a Ni-Rich Layered Oxide Core and a LiNi0_5Mn1.504-like Spinel Shell", ACS Applied Materials & Interfaces, 11(18), p. 16556-16566, XP055849699 (11 pages).

Zhang, Hanlei et al., (2017), "Atomic Insight into the Layered/ Spinel Phase Transformation in Charged LiNi0.80Co0.15A10.05O2 Cathode Particles", The Journal of Physical Chemistry, 121(3), p. 1421-1430, XP055849717 (10 pages).

Extended European Search Report issued Oct. 19, 2021, in corresponding European Patent Application No. 21179467.2 (7 pages).

Korean Office action issued Apr. 11, 2022, in corresponding KR Patent Application No. 10- 2020-0074439 (6 pages).

Japanese Office action issued Jul. 11, 2022, in corresponding JP Patent Application No. 2021-99374 (3 pages).

US Office Action dated Jun. 5, 2023, issued in U.S. Appl. No. 17/348,019 (24 pages).

Korean Notice of Allowance for KR Application No. 10-2020-0074439 dated Aug. 24, 2023, 3 pages.

US Final Office Action dated Dec. 11, 2023, issued in U.S. Appl. No. 17/348,019 (28 pages).

Chinese Office Action, with English translation, dated Jan. 9, 2024, issued in corresponding Chinese Patent Application No. 202110664549.0 (14 pages).

US Office Action dated Jul. 12, 2024, issued in U.S. Appl. No. 17/348,019 (50 pages).

Li et al., "Hidden Subsurface Reconstruction and Its Atomic Origins in Layered Oxide Cathodes," Nano Letters, 2020, 20, pp. 2756-2762.

US Final Office Action dated Jan. 30, 2025, issued in U.S. Appl. No. 17/348,019 (27 pages).

* cited by examiner (a) (b)

POSITIVE ELECTRODE ACTIVE MATERIAL FOR RECHARGEABLE LITHIUM BATTERY AND RECHARGEABLE LITHIUM BATTERY INCLUDING SAME

CROSS-REFERENCE TO RELATED APPLICATIONS

This application is a National Phase Patent Application of International Patent Application Number PCT/KR2019/002593, filed on Mar. 6, 2019, which claims priority of Korean Patent Application No. 10-2018-0056579, filed May 17, 2018. The entire contents of both of which are incorporated herein by reference.

TECHNICAL FIELD

This relates to a positive electrode active material for a rechargeable lithium battery and a rechargeable lithium battery including the same.

BACKGROUND ART

A lithium secondary battery has recently drawn attention as a power source for small portable electronic devices, and the lithium secondary battery uses an organic electrolyte solution and thereby has twice or more as high a discharge voltage than a conventional battery using an alkali aqueous solution, and accordingly, has high energy density.

As for a positive electrode active material of a lithium secondary battery, a lithium-transition metal oxide having a structure capable of intercalating/deintercalating lithium ions, such as $LiCoO_2$, $LiMn_2O_4$, $LiNi_{1-x}Co_xO_2$ ($0<x<1$), and the like has been mainly used.

As for negative electrode active materials, various carbon-based materials capable of intercalating/deintercalating lithium ions such as artificial graphite, natural graphite, and hard carbon have been used, and recently, a non-carbon-based negative electrode active material such as a silicon-based or tin-based material has been researched in order to obtain high capacity.

DISCLOSURE

Technical Problem

An embodiment provides a positive electrode active material for a rechargeable lithium battery exhibiting good capacity and cycle-life during charging and discharging, and improved stability.

Another embodiment provides a rechargeable lithium battery including the positive active material.

Technical Solution

One embodiment provides a positive electrode active material for a rechargeable lithium battery, including a core and a surface layer formed on the core, the core includes a first crystalline structure, and the surface layer includes the first crystalline structure and a second structure different from the first crystalline structure, and the first crystalline structure is included at more than the second crystalline structure in the surface layer.

According to another embodiment of the present invention, the rechargeable lithium battery includes a positive electrode including the positive electrode active material, a negative electrode including a negative electrode active material, and an electrolyte.

The exemplary matters of other embodiments of the present invention are included in the following detailed description.

Advantageous Effects

The positive electrode active material for a rechargeable lithium battery according to one embodiment exhibits higher capacity and good cycle-life characteristics.

MODE FOR INVENTION

Hereinafter, embodiments are described in detail. However, these embodiments are exemplary, and the present invention is not limited thereto and is defined by the scope of the following claims.

Figure 1:
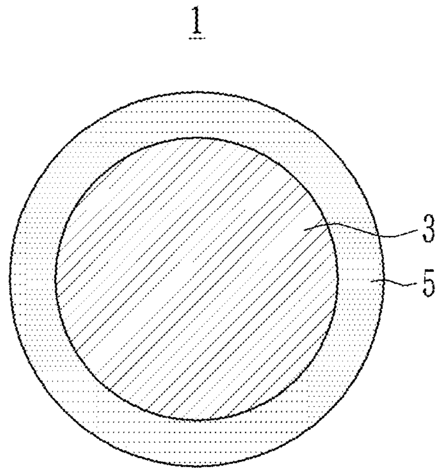
FIG. 1 is a drawing schematically showing the positive electrode active material for a rechargeable lithium battery according to one embodiment.

Hereinafter, referring to FIG. 1, the positive electrode active material according to one embodiment of the present invention will be illustrated. FIG. 1 is schematic view illustrating the positive electrode active material for a rechargeable lithium battery according to one embodiment of the present invention. As shown in FIG. 1, the positive electrode active material 1 according to one embodiment includes a core 3 and a surface layer 5 formed on the core.

The core 3 may include a compound represented by Chemical Formula 1.

$Li_aCo_{1-b}X_bO_2$ [Chemical Formula 1]

in Chemical Formula 1, $0.90 \le a \le 1.8$, $0 \le b \le 0.5$, and X is selected from Al, Ni, Co, Mn, Cr, Fe, Mg, Sr, V, a rare-earth element, or a combination thereof. Specifically, the core 3 may include a compound of $LiCoO_2$, $Li_{0.98}CoO_2$, $LiCo_{0.99}Al_{0.01}O_2$, $LiCo_{0.99}Mg_{0.01}O_2$, $LiCo_{0.99}Ni_{0.01}O_2$, or a combination thereof. The core 3, for example, the compound represented by Chemical Formula 1, may include a first crystalline structure, and may be a single phase of the first crystalline structure or two or more mixed phase including the first crystalline structure. Specifically, the core 3, for example, the compound represented by Chemical Formula 1, may include a layered structure as the first crystalline structure. More specifically, the core 3, for example, the compound represented by the Chemical Formula 1, may be a single phase of the layered structure or a mixed phase of two or more crystalline structures including the layered structure. If the core 3, for example, the compound represented by Chemical Formula 1, is the mixed phase, it may have the layered structure along with a spinel structure. As such, when the core 3, for example, the compound represented by Chemical Formula 1, includes the layered structure, it stabilizes the structure and improves the lithium diffusion speed, so that the active material may be effectively used in high power batteries.

The surface layer 5 may include a compound represented by Chemical Formula 1. Herein, the surface layer 5 may be a lithiated intercalation compound which is the same as or different from the core 3. Specifically, the surface layer may include a compound of $LiCoO_2$, $LiCo_{0.99}Al_{0.01}O_2$, $LiCo_{0.99}Mg_{0.01}O_2$, $LiCo_{0.98}Mg_{0.01}Al_{0.01}O_2$, or a combination thereof. The surface layer 5, for example, the compound represented by Chemical Formula 1 which is included in the surface layer 5, may include two or more crystalline structures that are different from each other. The crystalline structure may include the first crystalline structure and the second crystalline structure which is different from the first crystalline structure, and the first crystalline structure may be more included than the second crystalline structure in the surface layer 5. Specifically, the first crystalline structure may be a layered structure, and the second crystalline structure may be a spinel structure. More specifically, the surface layer 5 of the positive electrode active material 1 according to one embodiment, for example, the compound of Chemical Formula 1 included in the surface layer 5, includes two crystalline structures of the layered structure and the spinel structure as the crystalline structure, and herein, may mostly include the layered structure which is a main phase of the crystalline structures. As described, if the surface layer 5 of the positive electrode active material 1, for example, the compound of Chemical Formula 1 included in the surface layer 5, mostly includes the layered structure, the low-temperature characteristics may be improved and the cycle-life characteristics at room temperature and high temperatures may also be improved. If the surface layer 5, for example, the compound of Chemical Formula 1 included in the surface layer 5, only includes the spinel structure, or mainly includes the spinel structure as the main phase, the low-temperature characteristic may be deteriorated. This is because, as the surface layer 5, for example, the compound of Chemical Formula 1 included in the surface layer 5, mainly includes the layered structure as the main phase, lithium transferring may be more effectively performed so that lithium ions are easily deintercalated from the positive electrode active material, compared with inclusion of only the spinel structure or inclusion of the spinel structure as the main phase.

In the surface layer 5, the volume ratio of the first crystalline structure and the second crystalline structure may be 9:1 to 7:3. Particularly, the volume ratio of the layered structure and the spinel structure may be 9:1 to 7:3. In the surface layer 5, when the volume ratio of the first crystalline structure and the second crystalline structure is within the range, it allows rapid diffusion of Li, so that the surface power characteristics may be better.

The thickness of the surface layer 5 may be 10 nm to 100 nm. When the thickness of the surface layer 5 is within the range, the surface conductivity is good so that an excellent rate capability at a low temperature and room temperature may be exhibited. The positive electrode active material 1 according to the present embodiment may have an average diameter of 3 μm to 20 μm, specifically, 5 μm to 17 μm. When the diameter of the positive electrode active material is within the range, the density may be increased.

In one embodiment, the average diameter may be D50, and herein, the average diameter D50 refers to a diameter of a particle where an accumulated volume is 50 volume % in a particle distribution.

Hereinafter, the preparation of the positive electrode active material according to one embodiment will be illustrated. The above positive electrode active material may be prepared by the present embodiment.

The method of preparing the positive electrode active material according to the present embodiment may include preparing a mixture including a core having a compound of Chemical Formula 1, a lithium source, and a cobalt source; heat-treating the mixture to prepare a heated product; and cooling the heated product at a cooling rate of 4° C./min or less.

$$Li_aCo_{1-b}X_bO_2 \quad \text{[Chemical Formula 1]}$$

In Chemical Formula 1, $0.90 \le a \le 1.8$, $0 \le b \le 0.5$, and X is selected from Al, Ni, Co, Mn, Cr, Fe, Mg, Sr, V, rare earth elements, or a combination thereof.

Firstly, the sources included in the core represented by Chemical Formula 1, the lithium source, and the cobalt source, are mixed.

The core may be prepared by the following method. The core may be prepared by mixing a lithium-included material, a cobalt-included material, and optionally, an X-included material at a suitable ratio in order to have the mole ratio of Chemical Formula 1, and sintering the mixture. The sintering process may be performed at 700° C. to 1100° C. under an air atmosphere.

The lithium-included material may be lithium hydroxide, lithium carbonate, lithium nitrate, or a combination thereof. The cobalt-included material may be Co $(OH)_2$, $Co_3O_4$, CoO, or a combination thereof, and for example, $Co(OH)_2$. Furthermore, the X-included material may be an X-included hydroxide, an X-included carbonate, an X-included nitrate, or a combination thereof. The lithium source to be mixed with the core may be lithium hydroxide, lithium carbonate, lithium nitrate, or a combination thereof. The cobalt source to be mixed with the core and the lithium source may be $Co(OH)_2$, $Co_3O_4$, CoO, or a combination thereof, and for example, may be $Co(OH)_2$. In the mixing, a mole ratio of the cobalt source to the lithium source may be controlled in order to obtain the layered structure as the main phase in the final positive electrode active material. The cobalt source may be included at an amount of 4 parts by weight to 6 parts by weight based on the total weight of the core, the lithium source, and the cobalt source. For example, the mixing ratio of the core of Chemical Formula 1, the lithium source, and the cobalt source may be 94.0:1.0:5.0 to 93.0:1.0:6.0 as a weight ratio. When the cobalt source is used in the range, a material with a surface layer having the layered structure as the main phase may be prepared.

Thereafter, the mixed sources are heat-treated. The heat treatment may be performed at 800° C. to 1000° C., for example, 850° C. to 950° C., and when the heat treatment is performed in the temperature range, the excellent surface characteristic may be obtained. Furthermore, the heat treatment may be performed by increasing a temperature at an increasing rate of 1.2° C./min to 5° C./min, e.g., 2.5° C./min to 5° C./min, and when the heat treatment is performed at the increasing rate, the excellent surface characteristic may be obtained. In addition, as the heat treatment is further performed after preparing the core, a single material with Li and Co having one oxidation number, rather than various oxidation numbers, is produced, so that it may have more stable structure. Furthermore, the mixed sources are cooled. The cooling may be performed at 4° C./min or less, specifically, 3° C./min or less, and more specifically, 2.5° C./min or less. For example, the cooling may be performed at a cooling rate of 1.0° C./min to 2.5° C./min, or 1.2° C./min to 2.5° C./min. When the cooling is slowly performed at the cooling rate, the surface layer with the layered structure as a main phase may be obtained. If the cooling is quickly performed at more than 4° C./min, it is not desirable as the surface layer with the spinel structure as a main phase may be obtained. Particularly, even if the mixing ratio of the core of Chemical Formula 1, the lithium source, and the cobalt source is within the 94.0:1.0:5.0 to 93.0:1.0:6.0 weight ratio, a cooling rate of more than 4° C./min provides the surface layer with the spinel structure as a main phase, so it is not desirable.

After performing the heat treatment and before performing the cooling, a temperature maintaining process in which it is allowed to stand for 4 hours to 8 hours may be performed. When the temperature maintaining process is further performed, the additional phase on the surface of the core is reacted with the coating material to structural realign so that the ideal layered compound is formed, thereby exhibiting good electrochemical characteristics.

The positive electrode active material according to the present embodiment may have a single peak at 14,000 ppm to 14,200 ppm in a 1H solid Co NMR spectrum. The positive electrode active material having the above NMR spectrum indicates to only have $Co^{3+}$ phase of the single phase, that is, to not have a mixed phase of $Co^{2+}$, $Co^{4+}$, etc. As such, when the positive electrode active material includes only the $Co^{3+}$ phase, the advantages regarding capacity and the cycle-life characteristics may be obtained.

Another embodiment provides a lithium secondary battery including a positive electrode including the positive electrode active material, a negative electrode including a negative electrode active material, and an electrolyte.

The positive electrode includes a current collector, and a positive electrode active material layer formed on the current collector and including a positive electrode active material. An amount of the positive electrode active material may be 90 wt % to 98 wt % based on the total weight of the positive electrode active material layer.

In an embodiment, the positive electrode active material layer may further include a binder and a conductive material. Herein, each amount of the binder and the conductive material may be about 1 wt % to about 5 wt %, respectively, based on a total amount of the positive electrode active material layer.

The binder improves binding properties of the positive electrode active material particles with one another and with a current collector. Exemplary of the binder may be polyvinyl alcohol, carboxymethyl cellulose, hydroxypropyl cellulose, diacetyl cellulose, polyvinylchloride, carboxylated polyvinyl chloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like, but are not limited thereto.

The conductive material is included to provide electrode conductivity, and any electrically conductive material may be used as a conductive material unless it causes a chemical change in a battery. Examples of the conductive material include a carbon-based material such as natural graphite, artificial graphite, carbon black, acetylene black, ketjen black, a carbon fiber, and the like; a metal-based material of a metal powder or a metal fiber including copper, nickel, aluminum, silver, and the like; a conductive polymer such as a polyphenylene derivative; or a mixture thereof.

The current collector may use an aluminum foil, a nickel foil, or a combination thereof, but is not limited thereto.

The negative electrode includes a current collector and a negative electrode active material layer on the current collector and including a negative electrode active material. The negative electrode active material may be a material that reversibly intercalates/deintercalates lithium ions, a lithium metal, a lithium metal alloy, a material capable of doping and dedoping lithium, or a transition metal oxide.

The material that reversibly intercalates/deintercalates lithium ions may be a carbon material, and may be any carbon-based negative electrode active material that is generally used in a lithium ion secondary battery, and examples thereof may be crystalline carbon, amorphous carbon, or a combination thereof. Examples of the crystalline carbon may be a graphite such as non-specific shaped, sheet-shaped, flake, spherical shaped, or fiber-shaped natural graphite or artificial graphite, and examples of the amorphous carbon may be soft carbon or hard carbon, a mesophase pitch carbonized product, fired cokes, and the like.

The lithium metal alloy may include an alloy of lithium and a metal selected from the group consisting of Na, K, Rb, Cs, Fr, Be, Mg, Ca, Sr, Si, Sb, Pb, In, Zn, Ba, Ra, Ge, Al, and Sn.

The material capable of doping and dedoping lithium may be Si, a Si—C composite, $SiO_x$ ($0<x<2$), a Si-Q alloy (wherein Q is an element selected from the group consisting of an alkali metal, an alkaline-earth metal, a Group 13 element, a Group 14 element, a Group 15 element, a Group 16 element, a transition element, a rare earth element, and a combination thereof, and is not Si), Sn, $SnO_2$, a Sn—R alloy (wherein R is an element selected from the group consisting of an alkali metal, an alkaline-earth metal, a Group 13 element, a Group 14 element, a Group 15 element, a Group 16 element, a transition element, a rare earth element, and a combination thereof, and is not Sn), and the like, and at least one thereof may be mixed with $SiO_2$. The elements Q and R may be selected from the group consisting of Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Tl, Ge, P, As, Sb, Bi, S, Se, Te, Po, and a combination thereof.

The transition metal oxide may be vanadium oxide, lithium vanadium oxide, or lithium titanium oxide.

In the negative electrode active material layer, an amount of the negative electrode active material may be 95 wt % to 99 wt % based on a total amount of the negative electrode active material layer.

In an embodiment of the present invention, the negative electrode active material layer may include a binder, and optionally a conductive material. In the negative electrode active material layer, an amount of the binder may be 1 wt % to 5 wt % based on a total amount of the negative electrode active material layer. When the conductive material is further included, 90 wt % to 98 wt % of the negative electrode active material, 1 wt % to 5 wt % of the binder, and 1 wt % to 5 wt % of the conductive material may be used.

The binder serves to adhere the negative electrode active material particles to each other and to adhere the negative electrode active material to a current collector. The binder includes a non-water-soluble binder, a water-soluble binder, or a combination thereof.

The non-water-soluble binder may be selected from polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, polyamideimide, polyimide, or a combination thereof.

The water-soluble binder may be a rubber-based binder or a polymer resin binder. The rubber-based binder may be selected from a styrene-butadiene rubber, an acrylated styrene-butadiene rubber (SBR), an acrylonitrile-butadiene rubber, an acrylic rubber, a butyl rubber, a fluorine rubber, and a combination thereof. The polymer resin binder may be selected from polytetrafluoroethylene, polyethylene, polypropylene, an ethylene-propylene copolymer, polyethylene oxide, polyvinylpyrrolidone, polyepichlorohydrin, polyphosphazene, polyacrylonitrile, polystyrene, an ethylene-propylene-diene copolymer, polyvinylpyridine, chlorosulfonated polyethylene, latex, a polyester resin, an acrylic resin, a phenolic resin, an epoxy resin, polyvinyl alcohol, and a combination thereof.

When the water-soluble binder is used as the negative electrode binder, a cellulose-based compound may be further used to provide viscosity as a thickener. The cellulose-based compound includes one or more of carboxylmethyl cellulose, hydroxypropyl methyl cellulose, methyl cellulose, or alkali metal salts thereof. The alkali metal may be Na, K, or Li. Such a thickener may be included in an amount of 0.1 parts by weight to 3 parts by weight based on 100 parts by weight of the negative electrode active material.

The conductive material is included to provide electrode conductivity and any electrically conductive material may be used as a conductive material unless it causes a chemical change in a battery, and examples of the conductive material include: a carbon-based material such as natural graphite, artificial graphite, carbon black, acetylene black, ketjen black, a carbon fiber, and the like; a metal-based material of a metal powder or a metal fiber including copper, nickel, aluminum, silver, and the like; a conductive polymer such as a polyphenylene derivative; or a mixture thereof.

The current collector may include one selected from a copper foil, a nickel foil, a stainless steel foil, a titanium foil, a nickel foam, a copper foam, a polymer substrate coated with a conductive metal, and a combination thereof. The negative electrode and the positive electrode may prepared by mixing the active material, the conductive material, and the binder in a solvent to prepare an active material composition and coating the composition on the current collector.

The manufacturing method of the electrode is well known, and thus is not described in detail in the present disclosure. The solvent includes N-methylpyrrolidone and the like, but is not limited thereto. In addition, when a water-soluble binder is used for the negative electrode active material layer, water may be used as a solvent when preparing a negative electrode active material composition.

The electrolyte includes a non-aqueous organic solvent and a lithium salt. The non-aqueous organic solvent serves as a medium for transmitting ions taking part in the electrochemical reaction of a battery.

The non-aqueous organic solvent may include a carbonate-based, ester-based, ether-based, ketone-based, alcohol-based, or aprotic solvent.

The carbonate-based solvent may include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), and the like. The ester-based solvent may include methyl acetate, ethyl acetate, n-propyl acetate, dimethyl acetate, methyl propionate, ethyl propionate, decanolide, mevalonolactone, caprolactone, and the like. The ether-based solvent may include dibutyl ether, tetraglyme, diglyme, dimethoxyethane, 2-methyltetrahydrofuran, tetrahydrofuran, and the like. In addition, the ketone-based solvent may be cyclohexanone and the like. The alcohol-based solvent may include ethanol, isopropyl alcohol, and the like, and the aprotic solvent may include nitriles such as R—CN (wherein R is a C2 to C20 linear, branched, or cyclic hydrocarbon group, a double bond, an aromatic ring, or an ether bond), and the like, amides such as dimethyl formamide and the like, dioxolanes such as 1,3-dioxolane and the like, and sulfolanes and the like. The organic solvent may be used alone or in a mixture and when the organic solvent is used in a mixture, a mixture ratio may be controlled in accordance with a desirable battery performance, which may be understood by a person having ordinary skill in this art.

In addition, the carbonate-based solvent may include a mixture of a cyclic carbonate and a linear (chain) carbonate. In this case, when the cyclic carbonate and the linear carbonate may be mixed together in a volume ratio of 1:1 to 1:9, performance of an electrolyte solution may be enhanced.

The organic solvent may further include an aromatic hydrocarbon-based organic solvent in addition to the carbonate-based solvent. Herein, the carbonate-based solvent and the aromatic hydrocarbon-based organic solvent may be mixed in a volume ratio of 1:1 to 30:1.

The aromatic hydrocarbon-based organic solvent may be an aromatic hydrocarbon-based compound of Chemical Formula 3.

[Chemical Formula 3]

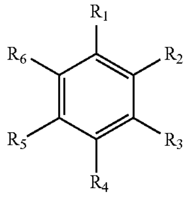

(In Chemical Formula 3, $R_1$ to $R_6$ are the same or different, and are selected from the group consisting of hydrogen, a halogen, a C1 to C10 alkyl group, a haloalkyl group, and a combination thereof.) Specific examples of the aromatic hydrocarbon-based organic solvent may be selected from the group consisting of benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 2,3-difluorotoluene, 2,4-difluorotoluene, 2,5-difluorotoluene, 2,3,4-trifluorotoluene, 2,3,5-trifluorotoluene, chlorotoluene, 2,3-dichlorotoluene, 2,4-dichlorotoluene, 2,5-dichlorotoluene, 2,3,4-trichlorotoluene, 2,3,5-trichlorotoluene, iodotoluene, 2,3-diiodotoluene, 2,4-diiodotoluene, 2,5-diiodotoluene, 2,3,4-triiodotoluene, 2,3,5-triiodotoluene, xylene, and a combination thereof. The electrolyte may further include an additive of vinylene carbonate or an ethylene carbonate-based compound of Chemical Formula 4 in order to improve cycle-life of a battery.

[Chemical Formula 4]

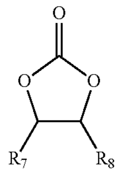

(In Chemical Formula 4, $R_7$ and $R_8$ are the same or different, and are selected from hydrogen, a halogen, a cyano group (CN), a nitro group ($NO_2$), and a fluorinated C1 to C5 alkyl group, provided that at least one of $R_7$ and $R_8$ is selected from a halogen, a cyano group (CN), a nitro group ($NO_2$), and a fluorinated C1 to C5 alkyl group, and $R_7$ and $R_8$ are not simultaneously hydrogen.)

Examples of the ethylene carbonate-based compound may be difluoroethylene carbonate, chloroethylene carbonate, dichloroethylene carbonate, bromoethylene carbonate, dibromoethylene carbonate, nitroethylene carbonate, cyanoethylene carbonate, or fluoroethylene carbonate. The amount of the additive for improving cycle-life may be used within an appropriate range.

The lithium salt dissolved in an organic solvent supplies a battery with lithium ions, basically operates the lithium secondary battery, and improves transportation of the lithium ions between a positive electrode and a negative electrode. Examples of the lithium salt include at least one supporting salt selected from $LiPF_6$, $LiBF_4$, $LiSbF_6$, $LiAsF_6$, $LiN(SO_2C_2F_5)_2$, $Li(CF_3SO_2)_2N$, LiN $(SO_3C_2F_5)_2$, $LiC_4F_9SO_3$, $LiClO_4$, $LiAlO_2$, $LiAlCl_4$, $LiN(C_xF_{2x+1}SO_2)(C_yF_{2y+1}SO_2)$, wherein x and y are natural numbers, for example an integer ranging from 1 to 20), LiCl, LiI, and $LiB(C_2O_4)_2$ (lithium bis(oxalato) borate: LiBOB). A concentration of the lithium salt may range from 0.1 M to 2.0 M. When the lithium salt is included at the above concentration range, an electrolyte may have excellent performance and lithium ion mobility due to optimal electrolyte conductivity and viscosity.

The separator may be disposed between the positive electrode and the negative electrode depending on a kind of a lithium secondary battery. Such a separator may use polyethylene, polypropylene, polyvinylidene fluoride, or multi-layers thereof having two or more layers, and may be a mixed multilayer such as a polyethylene/polypropylene double-layered separator, a polyethylene/polypropylene/polyethylene triple-layered separator, a polypropylene/polyethylene/polypropylene triple-layered separator, and the like.

Figure 2:
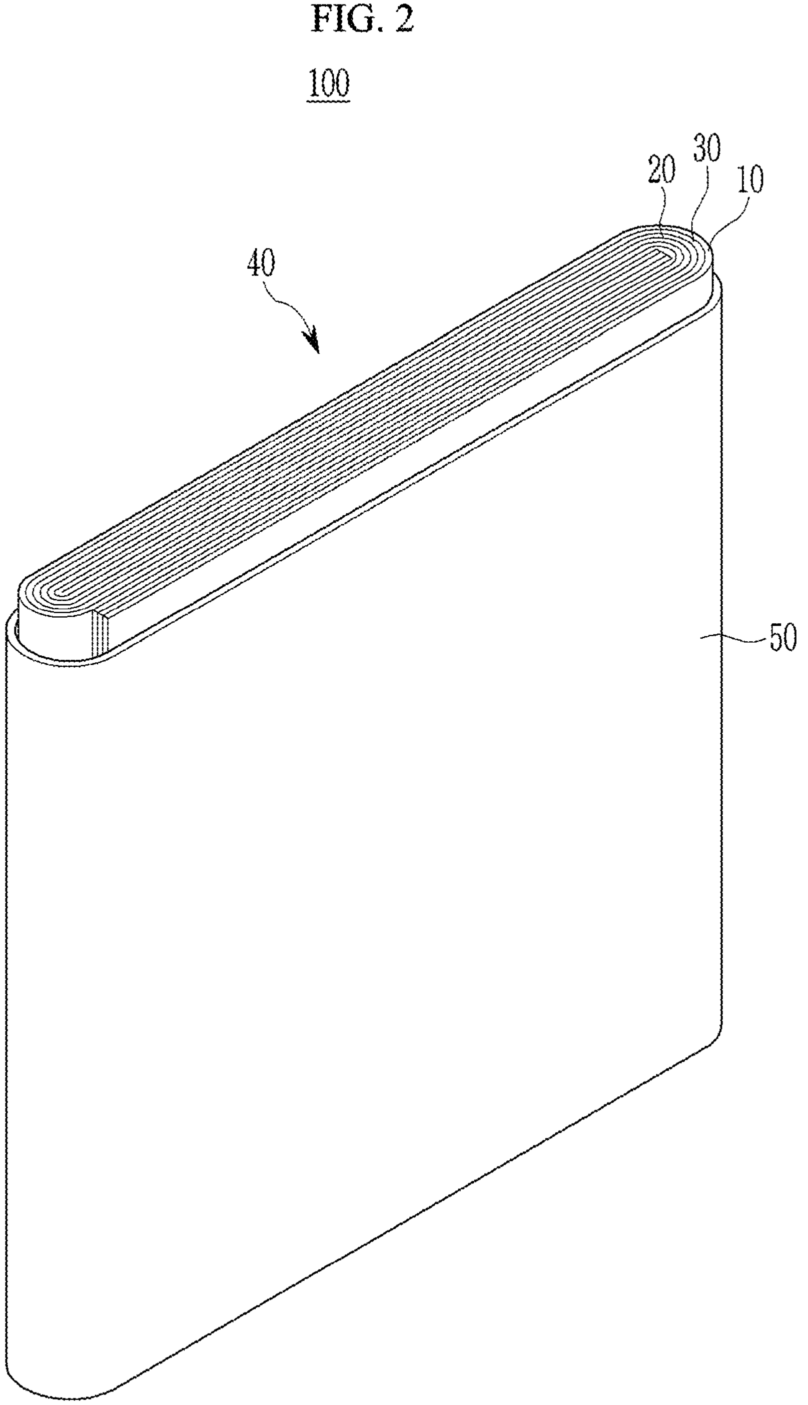
FIG. 2 is a drawing schematically showing a structure of a lithium secondary battery according to one embodiment of the present invention.

FIG. 2 is an exploded perspective view of a lithium secondary battery according to an embodiment. The lithium secondary battery according to an embodiment is illustrated as a prismatic battery, but is not limited thereto, and may include variously-shaped batteries such as a cylindrical or pouch-type battery.

Referring to FIG. 2, a lithium secondary battery 100 according to an embodiment includes an electrode assembly 40 manufactured by winding a separator 30 interposed between a positive electrode 10 and a negative electrode 20, and a case 50 housing the electrode assembly 40. The positive electrode 10, the negative electrode 20, and the separator 30 may be impregnated in an electrolyte solution (not shown).

EXAMPLES

Hereinafter, examples of the present invention and comparative examples are described. These examples, however, are not in any sense to be interpreted as limiting the scope of the invention.

Example 1

Lithium carbonate and $Co(OH)_2$ were mixed to have a mole ratio of Li to Co of 1.04:1, and the mixture was heat-treated at 1050° C. under an air atmosphere to prepare a $LiCoO_2$ core.

The prepared $LiCoO_2$ core was mixed with lithium carbonate and $Co(OH)_2$ to have a weight ratio of 93.5:1.0:5.5 to prepare a mixture. The mixture was heated by increasing a temperature at an increasing rate of 5° C./min until the temperature reached to 950° C., maintained at 950° C. for 4 hours, and cooled at a cooling rate of 1.5° C./min to 0° C.

According to the procedure, a positive electrode active material including a $LiCoO_2$ core and a $LiCoO_2$ surface layer formed on the core was produced. The surface layer had a thickness of 20 nm to 30 nm, and the surface layer included a layered structure as a main phase and a spinel phase as a side phase. The obtained positive electrode active material had an average diameter D50 of 17 μm.

Comparative Example 1

A $LiCoO_2$ core, lithium carbonate and $Co(OH)_2$ were mixed at a weight ratio of 93.5:1.0:5.5 to prepare a mixture.

A positive active material including a $LiCoO_2$ core and a $LiCoO_2$ coating layer formed on the core was prepared by the same procedure as in Example 1 except that the mixture was heated by increasing a temperature at an increasing rate of 5° C./min until the temperature reached to 950° C., maintained at 950° C. for 5 hours, and cooled at a cooling rate of 5° C./min to 0° C. The coating layer had a thickness of 20 nm to 30 nm and the coating layer had a spinel structure. The obtained positive electrode active material had an average diameter D50 of 17 μm.

Comparative Example 2

A positive active material including a $LiCoO_2$ core and a $LiCoO_2$ coating layer formed on the surface of the core was prepared by the same procedure as in Example 1, except that a $LiCoO_2$ core, lithium carbonate, and $Co(OH)_2$ were mixed at a weight ratio of 92.5:1.0:6.5 to prepare a mixture, and the mixture was used. The coating layer had a spinel structure. The obtained positive electrode active material had an average diameter D50 of 17 μm.

Comparative Example 3

$LiCoO_2$ was added to an Al-isopropoxide ethanol solution with a concentration of 0.5 wt %, and the mixture was heat-treated at 750° C. for 5 hours to prepare a positive electrode active material including a $LiCoO_2$ core and an $Al_2O_3$ coating layer formed on the surface of the core. The coating layer had a thickness of 10 nm. The coating layer had a spinel phase structure. The obtained positive electrode active material had an average diameter D50 of 17 μm.

Experiment 1: Measurement of Phase for Core and Active Material

Figure 3:
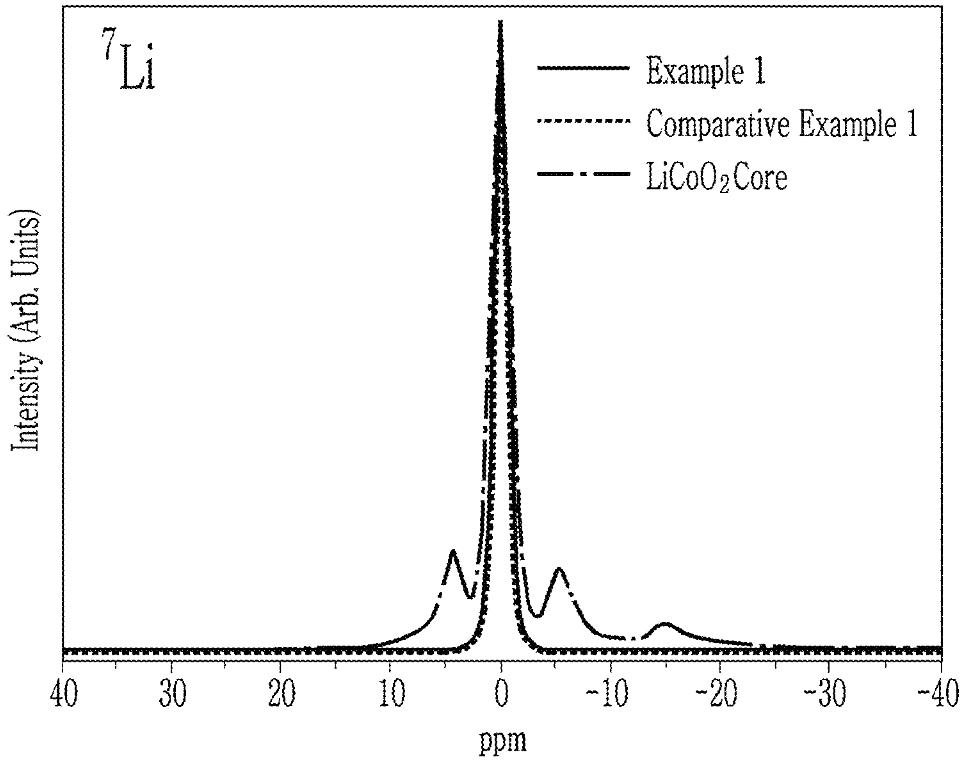
FIG. 3 is a graph showing a 1H solid $^7Li$ NMR spectrum for a $LiCoO_2$ core used in Example 1 and the positive electrode active materials prepared according to Example 1 and Comparative Example 1.
Figure 4:
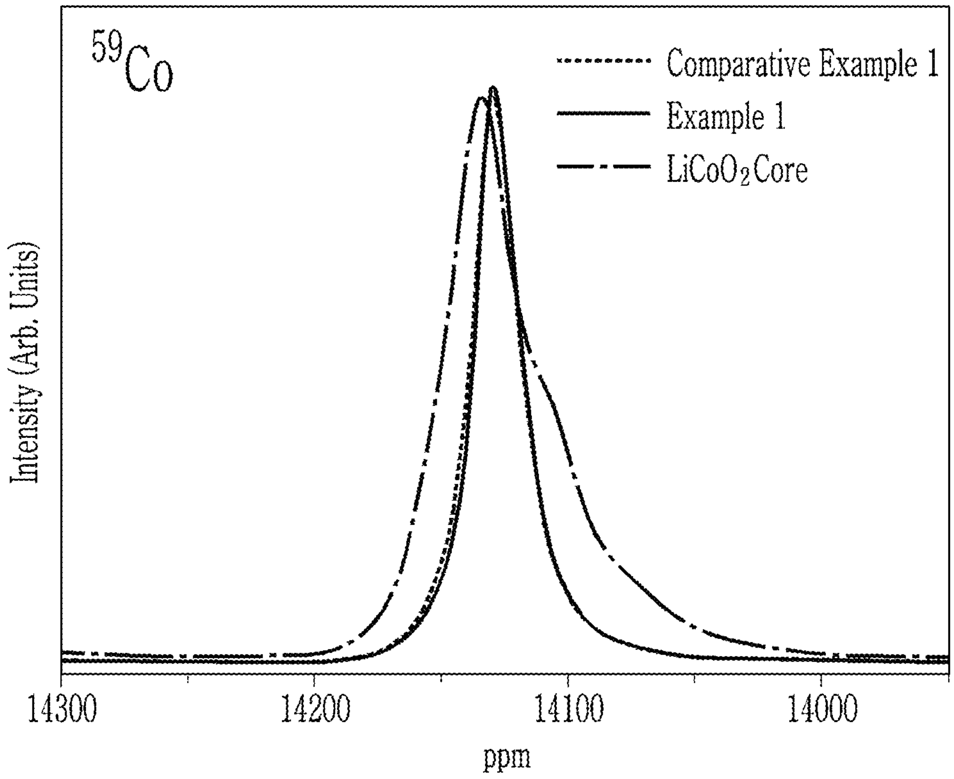
FIG. 4 is a graph showing a 1H solid $^{59}Co$ NMR spectrum for a $LiCoO_2$ core used in Example 1 and the positive active materials prepared according to Example 1 and Comparative Example 1.

With respect to the $LiCoO_2$ core used in the Example 1, and the positive electrode active material according to Example 1 and Comparative Example 1, a 1H solid $^7Li$ and $^{59}Co$ NMR spectrum was measured and the results are respectively shown in FIG. 3 and FIG. 4. As shown in FIG. 3 and FIG. 4, the $LiCoO_2$ core had multiple peaks and it indicated that Li with various oxidation numbers and Co with various oxidation numbers such as $Co^{2+}$ and $Co^{4+}$ were mixedly presented, but the positive electrode active materials according Example 1 and Comparative Example 1 had a single peak, particularly, a single peak at 14,000 ppm to 14,200 ppm in the $^{59}Co$ spectrum measurement, and it indicated a Li phase with a single oxidation number and a Co phase with a single oxidation number.

Experiment 2: Crystalline Structure Observation

Figure 5:
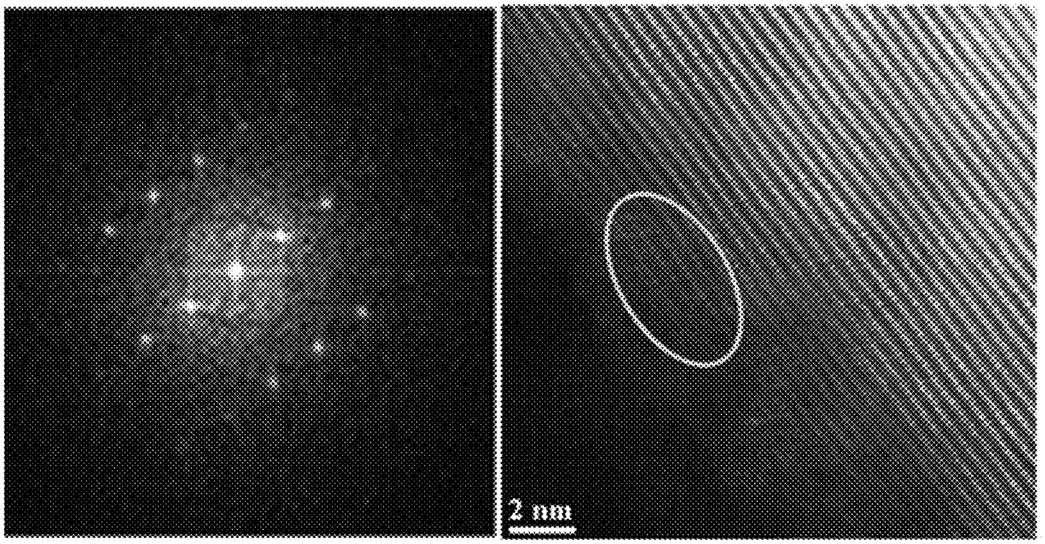
FIG. 5 is a SAD photograph of the active material according Example 1 (a) and a high resolution TEM photograph of the active material according Example 1 (b).
Figure 6:
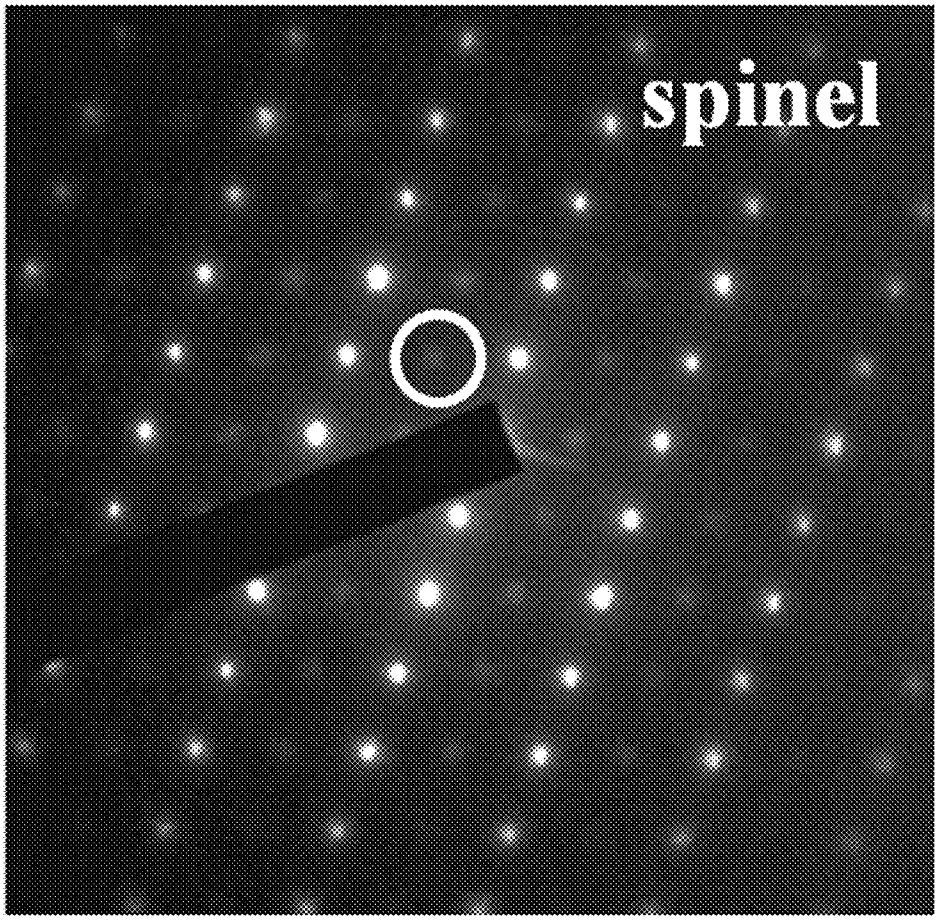
FIG. 6 is a TEM photograph of the positive electrode active material according to Comparative Example 1.

The surfaces of the positive electrode active material according to Example 1 and Comparative Example 1 were observed using a TEM, and the results are respectively shown in FIG. 5 and FIG. 6.

In FIG. 5, (a) is a SAD photograph of the positive electrode active material according to Example 1, and (b) of FIG. 5 is a high resolution transmission electron microscope photograph of the positive electrode active material according to Example 1. As shown in (a) of FIG. 5, the positive electrode active material according to Example 1 had no faint dotted line between the brightened dotted lines which consisted of the brightened dots, indicating the layered structure, and a layered structure is clearly shown from the results shown in (b) of FIG. 5.

Furthermore, as shown in FIG. 5, the positive electrode active material according to Example 1 mostly had the layered structure.

As shown in FIG. 6, the surface layer of the positive electrode active material according to Comparative Example 1 had faint dots (shown as circles) between the brightened dotted lines which consisted of the brightened dots, indicating the spinel phase structure. From these results, the surface layer of the positive electrode active material according to Comparative Example 1 mostly had the spinel phase structure.

Accordingly, it can be seen that in the surface layer of the positive electrode active material according to Example 1, the layered structure was mostly formed, and the surface layer of the positive electrode active material had the spinel phase structure.

Experiment 3: Measurement of Volume Ratio of Crystalline Structure

The volume ratio of the crystalline structure in the surface layer of the positive electrode active material according to Example 1 and Comparative Examples 1 to 3 was measured from the TEM results, and the results are shown in Table 1.

The measurement of the volume ratio was obtained by TEM for 10 particles of the positive electrode active materials, the same as Experiment 2, by observing the SAD pattern in the surface layer of the positive electrode active material, and quantifying it.

TABLE 1

| | Layered structure (a) | Spinel structure (b) | a:b volume ratio |
|---|---|---|---|
| Example 1 | 90 | 10 | 9:1 |
| Comparative Example 1 | 50 | 50 | 5:5 |
| Comparative Example 2 | 30 | 70 | 3:7 |
| Comparative Example 3 | 10 | 90 | 1:9 |

As shown in Table 1, the positive electrode active material according to Example 1 in which the cooling procedure was performed by slowly cooling at a rate of 1.5° C./min had the surface layer with the layered structure and the spinel structure at a 9:1 volume ratio, but the positive electrode active material according to Comparative Example 1 in which the cooling procedure was performed by quickly cooling at a rate of 5° C./min had the surface layer with the layered structure and the spinel structure at a 5:5 volume ratio. Furthermore, in case of Comparative Example 2 using cobalt hydroxide at an excess amount, lithium was lacking in the surface layer so that the spinel structure was largely presented, and in case of Comparative Example 3 in which an $Al_2O_3$ coating layer was formed, the surface layer mostly had the spinel phase.

Experiment 4: Conductivity Measurement 96 wt % of each of positive electrode active materials according to Example 1 and Comparative Examples 1 and 2, 2 wt % of a polyvinylidene fluoride binder, and 2 wt % of a ketjen black conductive material were mixed in an N-methyl pyrrolidone solvent to prepare a positive electrode active material slurry, and the positive active material slurry was coated on an Al foil, dried, and compressed to prepare a positive electrode.

Figure 7:
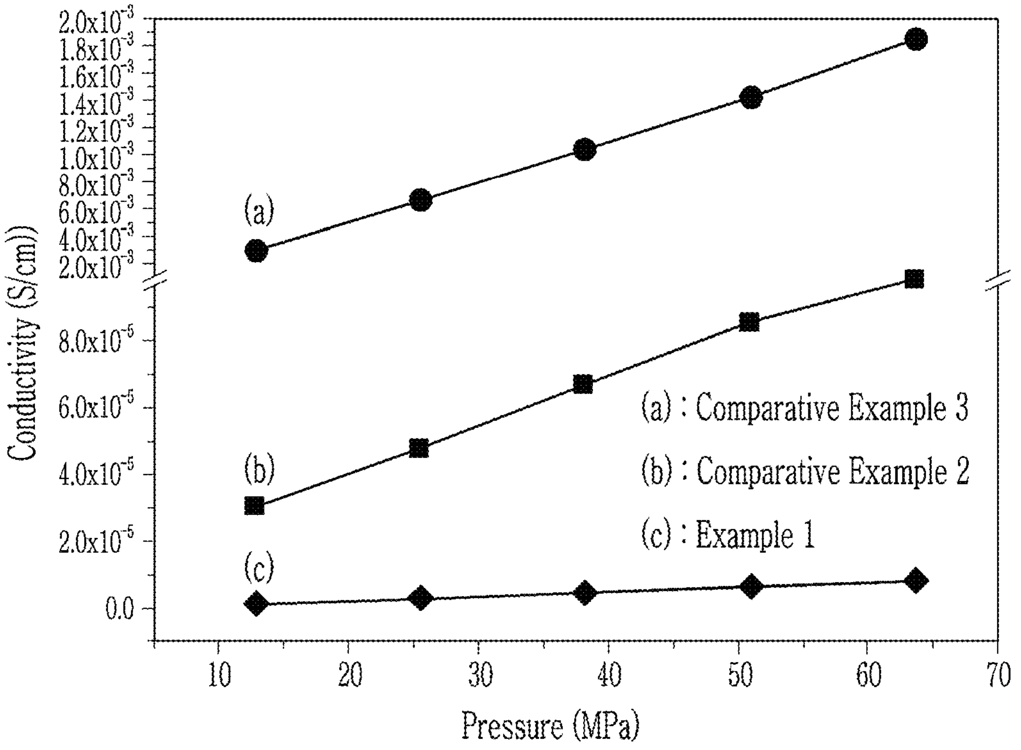
FIG. 7 is a graph showing ion conductivity of the positive electrode active materials according to Example 1 and Comparative Examples 1 and 2.

The conductivity of the positive electrode was measured and the result is shown in FIG. 7. The conductivity was measured by pressurizing at a pressure of 12 MPa, 25 MPa, 37 MPa, 51 MPa, and 64 MPa using an electrode conductivity measurement tool.

As shown in FIG. 7, the electrode conductivity of Example 1 was highly exhibited compared to those of Comparative Examples 1 and 2. As a result, the positive electrode active material of Example 1 had excellent ion conductivity. From the result, it can be seen that the positive electrode active material of Example 1 may be usefully applicable to high power rechargeable lithium batteries.

Experiment 5: Measurements of Charge and Discharge, Efficiency, and Cycle-Life Characteristics 96 wt % of each of positive electrode active materials according to Example 1 and Comparative Examples 1 and 2, 2 wt % of a polyvinylidene fluoride binder, and 2 wt % of a ketjen black conductive material were mixed in an N-methyl pyrrolidone solvent to prepare a positive electrode active material slurry, and the positive active material slurry was coated on an Al foil, dried, and compressed to prepare a positive electrode.

Using the positive electrode, a lithium metal counter electrode, and an electrolyte solution, a coin-type half-cell was fabricated. As the electrolyte solution, 1.0 M $LiPF_6$ dissolved in ethylene carbonate and diethyl carbonate (50:50 volume ratio) was used.

The half-cell was charged and discharged at 0.2C and a 4.5V cut-off once, the charge and discharge capacity was measured, and the efficiency ((discharge capacity/charge capacity)*100) was obtained using the capacities, which are shown in Table 2.

Furthermore, the half-cell was charged and discharged at 1C and a 4.5V cut-off at 45° C. 100 times, a ratio of the 100th discharge capacity to the $1^{st}$ discharge capacity was obtained, and the results are shown in Table 2 as a high-temperature cycle-life.

TABLE 2

| | Charge capacity (mAh/g) | Discharge capacity (mAh/g) | Efficiency (%) | High-temperature cycle-life (%) |
|---|---|---|---|---|
| Example 1 | 198.5 | 192.6 | 97.01 | 95.4 |
| Comparative Example 1 | 198.3 | 191.4 | 96.52 | 92.7 |
| Comparative Example 2 | 198.6 | 190.7 | 96.03 | 93.5 |
| Comparative Example 3 | 198.4 | 187.8 | 94.65 | 85.6 |

As shown in Table 2, the cell using the positive electrode active material according to Example 1 had higher charge and discharge capacity and excellent charge and discharge efficiency and high-temperature cycle-life characteristics than those of the positive electrode active material according to Comparative Examples 1 to 3.

While this invention has been described in connection with what is presently considered to be practical exemplary embodiments, it is to be understood that the invention is not limited to the disclosed embodiments, and on the contrary, it is intended to cover various modifications and equivalent arrangements included within the spirit and scope of the appended claims.

The invention claimed is:

1. A positive electrode active material for a rechargeable lithium battery, comprising, a particle comprising a core and a surface layer formed on the core, the core comprising a first core crystalline structure, the surface layer comprising a first surface crystalline structure and a second surface crystalline structure different from the first surface crystalline structure and the first core crystalline structure, the first surface crystalline structure being present at a higher concentration than the second crystalline structure in the surface layer, wherein a volume ratio of the first surface crystalline structure and the second surface crystalline structure is 9:1 to 7:3 in the surface layer, wherein the surface layer is the outermost layer of the particle, and wherein the first core crystalline structure is a layered structure, and the first surface crystalline structure is a layered structure which is a main phase, and the second surface crystalline structure is a spinel structure, and wherein the surface layer comprises a compound represented by Chemical Formula 1, $Li_aCo_{1-b}X_bO_2$ [Chemical Formula 1]

wherein, in Chemical Formula 1, $0.90 \le a \le 1.8$, $0 \le b \le 0.5$, and X is selected from Al, Ni, Co, Cr, Fe, Mg, Sr, V, rare-earth elements, or a combination thereof.

2. The positive electrode active material of claim 1, wherein the core comprises a compound represented by Chemical Formula 1 and including the first core crystalline structure:

$Li_aCo_{1-b}X_bO_2$ [Chemical Formula 1]

wherein, in Chemical Formula 1, $0.90 \le a \le 1.8$, $0 \le b \le 0.5$, and X is selected from Al, Ni, Co, Mn, Cr, Fe, Mg, Sr, V, rare-earth elements, or a combination thereof.

3. The positive electrode active material of claim 1, wherein the core and the surface layer comprise the same lithiated intercalation compound.

4. The positive electrode active material of claim 1, wherein the surface layer has a thickness of 10 nm to 100 nm.

5. The positive electrode active material of claim 1, wherein:

the positive electrode active material is prepared by mixing a core comprising a compound represented by Chemical Formula 1, a lithium source, and a cobalt source to prepare a mixture;

heat-treating the mixture to be a heat-treated product; and cooling the heat-treated product at a cooling rate of 4° C./min or less:

$Li_aCo_{1-b}X_bO_2$ [Chemical Formula 1]

wherein, in Chemical Formula 1, $0.90 \le a \le 1.8$, $0 \le b \le 0.5$, and X is selected from Al, Ni, Co, Mn, Cr, Fe, Mg, Sr, V, rare-earth elements, or a combination thereof.

6. The positive electrode active material of claim 5, wherein the cooling is performed at a cooling rate of 1.0° C./min to 2.5° C./min.

7. A rechargeable lithium battery, comprising:

a positive electrode comprising the positive electrode active material of claim 1;

a negative electrode comprising a negative electrode active material; and an electrolyte.

8. A positive electrode active material for a rechargeable lithium battery, comprising, a particle comprising a core and a surface layer formed on the core, the core comprising a first core crystalline structure, the surface layer comprising a first surface crystalline structure and a second surface crystalline structure different from the first surface crystalline structure and the first core crystalline structure, the first surface crystalline structure being present at a higher concentration than the second crystalline structure in the surface layer, and the first surface crystalline structure is a layered structure as a main phase, wherein the surface layer comprises a compound represented by Chemical Formula 1

$Li_aCo_{1-b}X_bO_2$ [Chemical Formula 1]

wherein, in Chemical Formula 1, $0.90 \le a \le 1.8$, $0 \le b \le 0.5$, and X is selected from Al, Ni, Co, Cr, Fe, Mg, Sr, V, rare-earth elements, or a combination thereof.

9. The positive electrode active material for a rechargeable lithium battery of claim 1, wherein the core further comprises a second core crystalline structure and the second core crystalline structure is a spinel structure.

10. The positive electrode active material for a rechargeable lithium battery of claim 8, wherein the core further comprises a second core crystalline structure and the second core crystalline structure is a spinel structure.

* * * * *